Aug. 24, 1937.  J. L. GETAZ  2,090,791
AUTOMOBILE TRANSMISSION
Filed April 19, 1934    2 Sheets-Sheet 2
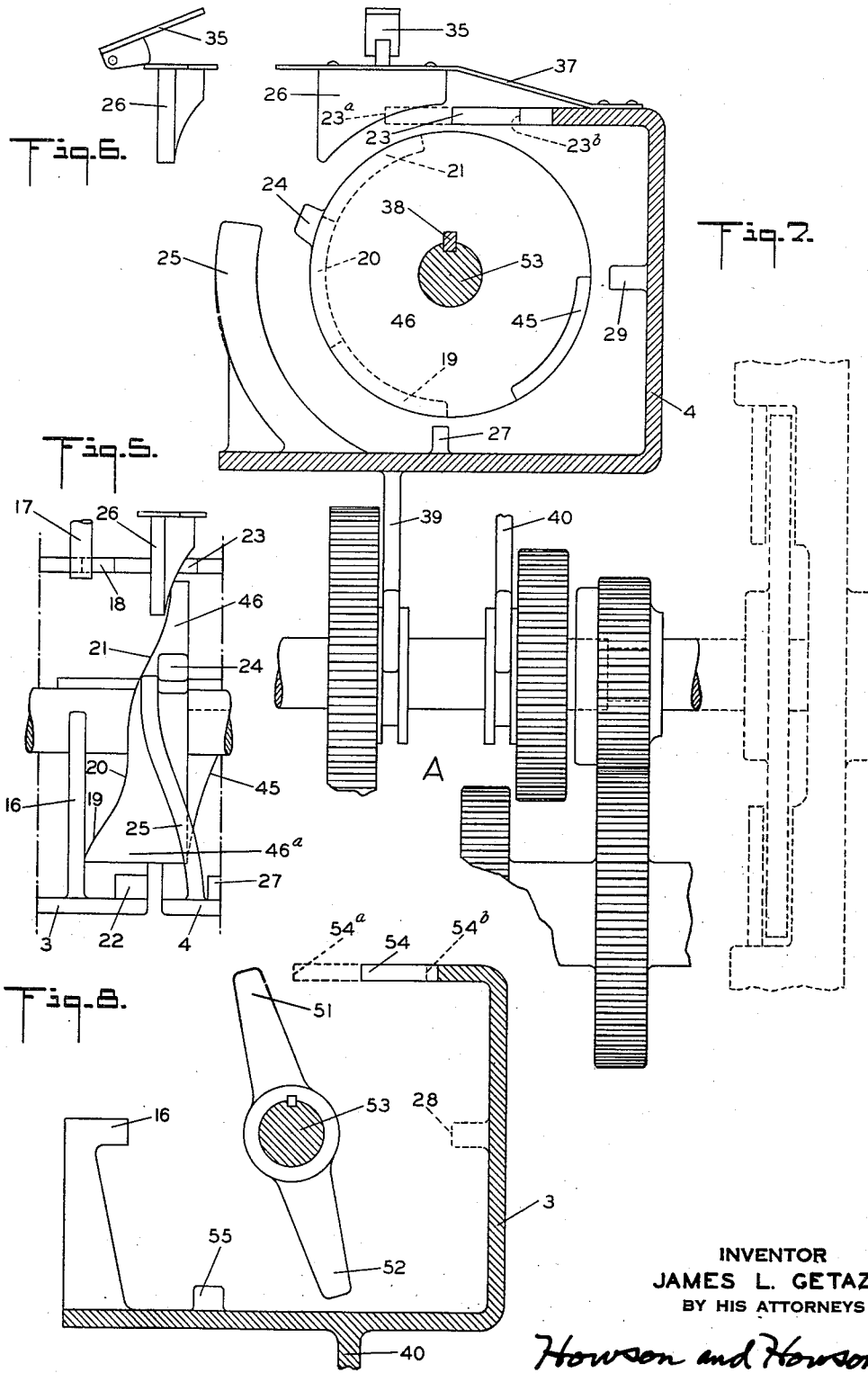
INVENTOR
JAMES L. GETAZ
BY HIS ATTORNEYS
Howson and Howson Patented Aug. 24, 1937

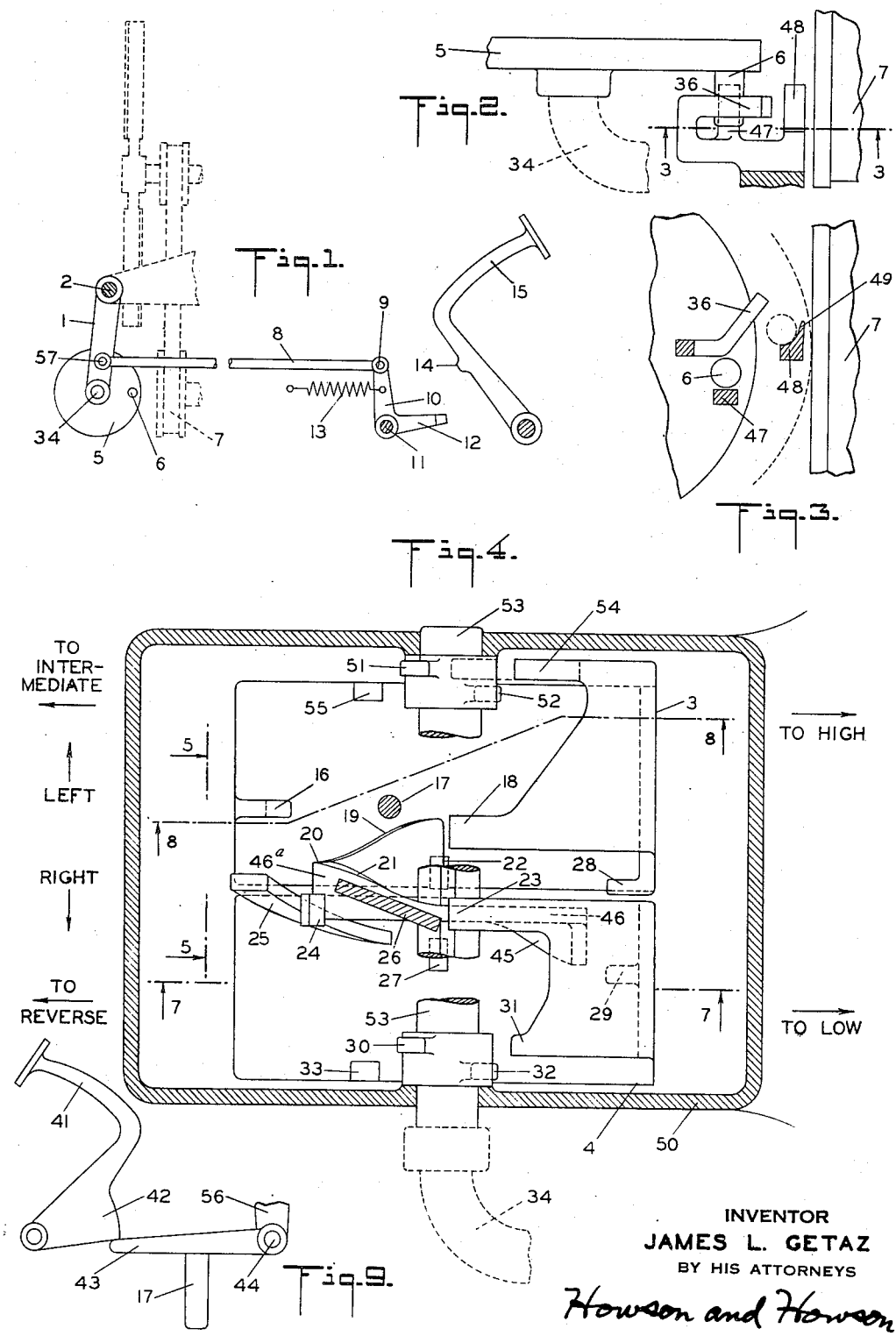

2,090,791

UNITED STATES PATENT OFFICE 2,090,791

AUTOMOBILE TRANSMISSION

James L. Getaz, Maryville, Tenn.

Application April 19, 1934, Serial No. 721,405

44 Claims. (Cl. 74—335)

This invention relates to automobile transmissions and more particularly to means for operating or shifting an automobile transmission in order to establish different gear ratios and it is an object of this invention to provide an improved operating means for an automobile transmission of such construction that each operation of the transmission to a gear ratio position adjusts the operating means to operate the transmission to a particular gear ratio position upon the succeeding operation thereof and it is also an object of this invention to provide in an automobile transmission operating means of the type described, means whereby the normal operation of the transmission by the operating means is prevented and the transmission is operated to the neutral position. It is also an object of this invention to provide in an automobile transmission operating means of the type described, means for controling the operation of the transmission to the reverse gear position of such construction that a positive selection on the part of the operator is required.

In the drawings which show a preferred embodiment of this invention:—

Fig. 1 is a diagrammatic view illustrating the manner in which the operating means are controlled;

Fig. 2 is a fragmentary plan view showing details of the control shown in Fig. 1;

Fig. 3 is a section taken as on line 3—3 of Fig. 2;

Fig. 4 is a horizontal section through the upper portion of the gear set housing showing in plan the connection of the operating means to the gear set; parts being broken away to show other parts more clearly;

Fig. 5 is a fragmentary view in elevation showing the relation to the operating means of the means for preventing the operation of the gear set past neutral position and the means for causing the operating means to shift the gear set to the reverse gear position;

Fig. 6 is a diagrammatic view showing the manner of controlling the operating means for effecting movement of the gear set to the reverse gear position;

Figs. 7 and 8 are vertical sections taken as on lines 7—7 and 8—8 of Fig. 4; Fig. 7 showing the connection of the operating means to the gear set; and Fig. 9 is a diagrammatic view showing the manner of controlling the operating means to stop movement of the gear set in the neutral position.

As shown in the drawings an automobile transmission constructed in accordance with this invention comprises the usual change-speed gears or gear set, as shown at A, the gears of which are operated by yokes 39 and 40 connected to operating rails 4 and 3, respectively, which are mounted for reciprocal movement in the upper portion 50 of the gear set casing. The operating rails 4, 3, as shown, comprise spaced upper and lower horizontal portions joined at one end by vertical portions, the upper portions being of less length than the lower portions and irregularly shaped.

As shown in Figures 4 and 7, the lower or base portion of the rail 4 is provided with the upwardly projecting abutments 33 and 27 and with a cam member 25. The vertical portion of the rail 4 is provided with an inwardly projecting abutment 29 and the upper portion of the rail is cut away so as to provide abutments 31 and 23. Similarly the lower or base portion of the rail 3 is provided with upwardly projecting abutments 22 and 55 and with an abutment 16 raised above the bottom portion of the rail while projecting inwardly from the vertical portion of the rail is an abutment 28. The upper portion of the rail is cut away to form the abutments 18 and 54. Both rails are movable in opposite directions from a central or neutral position so that the various abutments may take different positions at different times; thus the abutment 54 of rail 3 may be moved from its neutral position at 54 to positions at 54a and 54b on opposite sides of its neutral position as shown in Fig. 8 and abutment 23 of rail 4 may be shifted from its neutral position at 23 to positions at 23a and 23b, respectively, as shown in Fig. 7.

Rotatably mounted in the upper portion 50 of the gear casing is a shaft 53 so positioned as to extend between the upper and lower portions of the rails 3 and 4. Fixedly secured to the shaft 53, adjacent one wall of the casing 50, is a hub having secured thereto the arms 51 and 52 offset with respect to each other and of sufficient length to engage with abutments on the rail 3, the arm 51 being positioned to cooperate with the abutment 54 while the arm 52 is positioned to cooperate with the abutment 55. Similarly secured to the shaft 53, adjacent the opposite wall of the casing 50, is a similar hub having the offset radiating arms 30 and 32, arm 30 being positioned to cooperate with the abutment 31 on the upper portion of the rail 4, while the arm 32 is positioned to cooperate with the abutment 33 on the lower portion of the rail 4.

Keyed to the shaft 53, intermediate the hubs thereon, is a disc 46 which rotates with the shaft 53 but which is movable axially thereof. The disc 46 is provided with an abutment 24, projecting from the perimeter thereof, with a cam member 45 projecting laterally from one face of the disc, and projecting laterally from the opposite face of the disc 46 and angularly disposed with respect to the cam 45, with a cam member 46a having the inclined cam surfaces 21 and 19 joined by a surface 20 parallel to the plane of the disc.

Secured to the upper portion of the rail 4 by a spring member 37 is a plunger 26 arranged to be depressed by a pedal 35 which may be the accelerator pedal or other suitably operated means. Plunger 26 is so positioned that when depressed it presents a cam face for engagement by the lug 24 on the disc 46 and serves to move the disc 46 to the right on the shaft 35 as shown in Figure 4. Pivotally connected, as at 44, to a bracket 56 attached to a convenient portion of the car frame is an arm 43 carrying a downwardly extending pin or plunger 17 which projects into the upper portion of the gear casing 50 in position to be engaged in certain positions of the disc 46 by the cam surfaces 21, 20, 19, on the disc 46. The arm 43 may be operated by any suitably operated means, as the brake pedal 41, having a cam portion 42 which operates the arm 43 and retains the arm in its depressed position while the pedal is depressed.

To operate the shaft 53 and disc 46 the shaft 53 is connected by a flexible shaft 34 to a disc 5 rotatably supported in an arm 1 which is pivotally mounted at 2 in a bracket attached at a convenient portion of the engine or frame. Adjacent the disc 5 is a disc or pulley 7 which may be a rotating part of the engine or be driven therefrom by suitable operating means and which is provided with a suitable driving or contact surface for engagement by the disc 5. Disc 5 has a contact face thereon provided with suitable friction material so that upon engagement with the disc or pulley 7 the disc 5 is rotated, rotating the shaft 34 and shaft 53 in such a manner that the disc 46 is rotated in a clockwise direction. To bring the disc 5 into contact with the disc 7 there is provided a rod 8 pivotally connected at one end, as at 57, to the arm 1 and pivotally connected at the other end, as at 9, to the free end of the arm 10 of a bell-crank lever which is pivotally mounted, as at 11, and the other arm 12 of which is positioned to be engaged by a lug 14 upon a suitably operated lever 15 which may be the clutch operating pedal of the automobile. To shift the disc 5 from the disc 7 and ensure it being held away from contact therewith when not in use there is provided a spring 13 connected at one end to the arm 10 and fastened at the other end to a part on the engine or car frame. In order to prevent continued operation of the disc 5 when the pedal 15 is depressed there is provided on the disc 5 a projection or lug 6 adapted when the disc 5 is in contact with the disc 7, to engage with the tapered edge 49 of the lug 48 forming part of a bracket secured to a convenient part of the engine or frame. Also forming part of the same bracket is a guide member 36 and a second lug 47 which projects beneath the guide member 36. Upon rotation of the disc 5, when the pedal 15 is depressed, lug 6 engages with the lug 48 and moves the disc 5 sufficiently far from the disc 7 to prevent continued wear upon the disc 5. As the pedal 15 is raised the spring 13 moves the disc 5 further from the disc 7 and the lug 6 on the disc 5 engages with the member 36 and rotates the disc 5 slightly bringing the lug 6 above the lug 47 and beneath the member 36, as shown in Figure 3, when the disc 5 is in the fully released position. In this position of the disc 5 the lug 6 is below the lug 48 so that upon depressing the pedal 15 and operating the bell-crank lever to bring the disc 5 into engagement with the disc 7, the lug 6 will pass below the lug 48 and the disc 5 may rotate until the lug 6 contacts with the lug 48 and shifts the disc 5 from the disc 7, such rotation of the disc 5 causing a complete clockwise rotation of the disc 46.

With the disc 46 in the neutral position, as shown in Figures 4 and 7, depressing the pedal 15 brings the disc 5 into engagement with the disc 7 rotating the shaft 53 and the disc 46 in a clockwise direction. The lug 24 attached to disc 46 on completing the first quadrant of its rotation comes in contact with the abutment 23 on the upper part of rail 4, and shifts rail 4 into the low gear position. The cam member 25 is brought close to the disc 46 as the rail 4 is shifted into the low gear position and on entering the last quadrant of its rotation the right side of the lug 24 engages the left side of the cam member 25 and the disc 46 is shifted to the left on the shaft 53 so that lug 24 is moved out of the plane of rotation which brought it in contact with the abutment 23 of rail 4 and is moved into the plane of rotation which will bring it in contact with lug 22 on the lower portion of rail 3. When the rail 4 is in its neutral position the cam member 25 is beyond the path of the lug 24, as shown in Figure 7.

With the gear set in the low gear position depressing the pedal 15 will again cause the rotation of the shaft 53 and disc 46 and during the first quadrant of this rotation the rail 4 is shifted back to the neutral position by the action of arm 32 on the abutment 33 which projects from the lower part of the rail 4. As the third quadrant of this rotation is being completed, the lug 24 on disc 46 engages the abutment 22 on the lower part of rail 3, and shifts the rail into the intermediate or second gear position. The abutment 28 on rail 3 is brought closer to the center of the disc 46 as the rail 3 is shifted into the intermediate gear position and to a position in which it engages the cam member 45 on disc 46. When the rail 3 is in its neutral position the abutment 28 is beyond the path of the cam member 45. During the fourth quadrant of this rotation, the cam member 45 engages the abutment 28 and shifts the disc 46 farther to the left on the shaft 53 so that lug 24 is shifted out of the plane of the abutment 22 and into the plane of the abutment 18. The pedal 15 is then raised and the clutch engaged for driving the car in the intermediate gear. If the driver wishes to shift the gear set to the high gear position without driving in the intermediate gear, the pedal 15 is raised sufficiently to release the bell crank 12 and again pressed down thereby causing another rotation of the disc 5 and shaft 53 and disc 46.

With the gear set in the intermediate gear position rotation of shaft 53 causes the rail 3 to be shifted into neutral position by the action of arm 51 on the abutment 54. Shifting of the rail 3 to neutral position is completed during the first quadrant of this rotation and, as this first quadrant is being completed, lug 24 engages the abutment 18 on rail 3 and shifts the rail into the high gear position. When the rail 3 is in the neutral position the abutment 16 is beyond the path of the cam 46a and while the movement of the rail 3 to the high gear position brings the abutment 16 closer to the center of the disc 46 the cam surface 19 passes the position of the abutment 16 before the rail 3 completes its movement to the high gear position. During the fourth quadrant of this rotation—after the rail 3 is in the high gear position—the cam surface 21 engages the abutment 16 and shifts the disc 46 to the right so that lug 24 is shifted out of the plane of the abutment 18 and into the plane of the abutment 22.

With the rail 3 in the high gear position, the abutment 16 on rail 3 has been moved closer to the disc 46, and when disc 46 is in its normal position, abutment 16 is below the lower part of the cam surface 21 and in contact with the straight surface 20. On the next rotation of shaft 53, during the first quadrant of the rotation the rail 3 is shifted into neutral position by the action of arm 52 on lug 55. While the rail 3 is being shifted into neutral position, abutment 16 remains in contact with the straight edge 20, so that the abutment 16 does not shift the disc 46. As the third quadrant of this rotation is being completed, lug 24 engages abutment 22 and shifts the rail 3 into the intermediate gear position. During the fourth quadrant of this revolution the cam surface 45 engages the abutment 28 and shifts the disc 46 to the left, moving the lug 24 out of the plane of the abutment 22 and into the plane of the abutment 18 so that on the next rotation of the shaft 53 the rail 3 will be shifted into the high gear position as previously described. Thus the rail 3 can be shifted back and forth between the intermediate and high gear positions by repeated operations of the shaft 53 and disc 46.

To shift the gear set to the neutral position from a gear ratio position the operator causes the shaft 53 to be operated while the pedal 41 is pressed down. When the pedal 41 is pressed down the pin 17 carried by lever 43 is moved into the path of the cam surfaces 21, 20 and 19 on the disc 46. If the rail 3 is in the intermediate position and the disc 46 is in its extreme left position, so that on the next revolution of the disc the rail 3 will be moved into the high gear position during the first quadrant of this revolution, rail 3 is shifted into neutral position by the action of the arm 51 on the abutment 54 and while the rail 3 is being moved to the neutral position the cam surface 21 on disc 46 engages the pin 17 and shifts the disc 46 to the right before lug 24 engages the abutment 18. During the second quadrant of this revolution the disc 46 is shifted still further to the right by the engagement of the cam surface 19 with the pin 17 so that as the disc 46 completes the second quadrant of this revolution the lug 24 is moved to the right of the abutment 22 into the plane of the abutment 23 on the rail 4.

Similarly, if the rail 3 is in the high gear position the gear set can be shifted to the neutral position by rotating shaft 53 when the brake pedal is pressed down causing the rail 3 to be shifted to the neutral position by the action of arm 52 on the abutment 55 and the lug 24 to be shifted from the plane of the abutment 22 to the right during the second quadrant of the rotation of the disc by the action of the cam surface 19 on pin 17, as previously described.

If the rail 4 is in position for low gear, the operator may stop the car with gears in the neutral position in the same manner and be in a position to start the car again in low gear. In this operation rail 4 is shifted into the neutral position by the action of the arm 32 on the abutment 33 and disc 46 is shifted to the right during the second quadrant of its rotation by the action of the cam surface 19 on pin 17, as described above, moving lug 24 from the plane of abutment 22 on rail 3 into the plane of the abutment 23 on rail 4.

The gear set may be shifted from the neutral position to the reverse gear position by rotating the shaft 53 while the pedal 35 is pressed down. Pedal 35 upon being pressed down presses down the plunger 26 which is attached to the upper part of rail 4 by the flat spring 37 placing the plunger 26 in the path of the lug 24 when the lug 24 is in the plane of the abutment 23 on the upper part of rail 4 and when the pedal 35 is raised the plunger 26 is withdrawn from the path of the abutment 24 by the action of spring 37.

If the shaft 53 is rotated while the lug 24 is in the plane of the abutment 23 and the plunger 26 pressed down by the pedal 35, the left side of the abutment 24 engages the right side of the plunger 26, and during the first quadrant of this rotation the disc 46 is shifted to the right so that lug 24 does not engage the abutment 23 on the upper part of rail 4 but on finishing the third quadrant of the rotation the lug 24 engages the abutment 27 attached to the bottom part of rail 4 and shifts rail 4 into the reverse gear position. As rail 4 is shifted into the reverse gear position, the abutment 29 on rail 4 is brought closer to the shaft 53 and during the fourth quadrant of this rotation the cam member 45 on disc 46 engages the abutment 29 and shifts the disc 46 to the left and the lug 24 into the plane of the abutment 23 in position to shift rail 4 into the low gear position on the next rotation of shaft 53.

What is claimed is:—

1. In an automobile transmission, a gear set having operating rails to shift said gear set to different positions, means engaging said rails for effecting operation thereof, said means rotating in one direction for all operations of said rails and means automatically shifting said engaging means transversely of said rails upon each operation of said rails to a gear ratio position.

2. In an automobile transmission, a gear set having operating rails to shift said gear set to different positions, means shiftable with respect to said rails and rotated in one direction to operate said rails, cooperating means on said rails and rotating means for shifting said rotating means and means to control said rotating means to selectively operate said rails.

3. In an automobile transmission, a gear set having operating rails to shift said gear set to different positions, means rotated in one direction engaging said rails to establish different gear ratio positions, means rotating in the same direction as said operating means for operating said gear set to neutral position from any gear ratio position and means to control said engaging means to selectively operate said rails.

4. In an automobile transmission, a gear set having operating rails to shift said gear set to different gear ratio positions, a rotatable rail operating means engaging said rails and means shifting said operating means upon each rotation thereof for the operation of a rail for a predetermined gear ratio selection upon the next operation of a rail.

5. In an automobile transmission, a gear set having operating rails to shift said gear set to different positions, means rotated in one direction for all operations of the rails and engaging said rails to operate said rails to shift said gear set and means automatically adjusting said rotating means to determine the position to which the gear set is shifted.

6. In an automobile transmission, a gear set having operating rails to shift said gear set to different gear ratio positions, a rotatable operating means, adapted to engage said rails and rotating in one direction for all operations of said rails to gear ratio positions, means for selectively engaging said operating means and rails, and means for automatically engaging said operating means and rails in a predetermined sequence.

7. In an automobile transmission, a gear set having operating rails to shift said gear set to different gear ratio positions, operating means for said rails, adapted to engage said rails and rotating in one direction for all operations of said rails, means automatically adjusting said operating means to operate said rails to shift said gear set from one gear ratio position to another upon each operation of said means, and means for adjusting said operating means to operate said rails to shift said gear set from any gear ratio position to neutral position.

8. In an automobile transmission, a gear set having operating rails to shift said gear set to different gear ratio positions and a rotatable operating means for said rails rotating in one direction comprising means common to said rails for operating said rails to gear ratio positions and means individual to each rail for operating said rails from a gear ratio position to the neutral position.

9. In an automobile transmission, a gear set having operating rails to shift said gear set to different gear ratio positions, a rotatable operating means for said rails comprising means common to said rails for operating said rails to gear ratio positions and means individual to each rail for operating said rails from a gear ratio position to the neutral position and means preventing operation of said rails by said common means upon rotation of said rail operating means.

10. In an automobile transmission, a gear set having an operating rail for shifting said gear set to intermediate and high gear ratio positions, a rotatable operating means for said rail, adapted to engage said rail, and means operated on movement of said rail for automatically adjusting said rail operating means to operate said rail to shift said gear set between intermediate and high gear ratio positions upon repeated operation of said rail operating means.

11. In an automobile transmission, a gear set having an operating rail for shifting said gear set to intermediate and high gear ratio positions, a rotatable operating means for said rail, said operating means being adapted to engage said rail and arranged to operate said rail to shift said gear set between intermediate and high gear ratio positions upon repeated operation of said operating means, and means for causing said operating means to leave said gear set in neutral position upon any operation thereof.

12. In an automobile transmission, a gear set having operating rails for shifting said gear set to different gear ratio positions for forward and reverse movement, a rotatable operating means rotating to operate said rails, cooperating means on said operating means and rails for positioning said operating means for the next operation of said gear set to a gear ratio position upon each operation of said gear set to a forward gear ratio position and means for positioning said rail operating means for operating said rails to establish a reverse gear ratio position.

13. In an automobile transmission, a gear set having operating rails for shifting said gear set to different gear ratio positions for forward and reverse movement, a rotatable operating means rotating to operate the rails, cooperating means on said operating means and rails for positioning said operating means for the next operation of said gear set to a gear ratio position upon each operation of said gear set to a forward gear ratio position and manually operated means for positioning said rail operating means for operating said rails to establish neutral and reverse gear ratio positions.

14. In an automobile transmission, a gear set having operating rails to shift said gear set to different gear ratio positions, a rotatable shaft, an arm slidably mounted on and operated by said shaft and means on said rails for shifting said arm on said shaft upon each operation of a rail to position said arm for a predetermined following operation of the gear set.

15. In an automobile transmission, a gear set having operating rails to shift said gear set to different gear ratio positions, a rotatable shaft, an arm rotated by said shaft and means on one of said rails for shifting said arm laterally with respect to said one rail to engage said rail for operation in opposite directions to establish different gear ratios by rotation of said arm in one direction by said shaft.

16. In an automobile transmission, a gear set having operating rails to shift said gear set to different gear ratio positions, a rotatable shaft, an arm operated by said shaft and means on said arm and a rail cooperating to shift said arm laterally with respect to said rail to engage said rail for operation to a plurality of gear ratio positions upon repeated operation of said shaft.

17. In an automobile transmission, a gear set having operating rails to shift said gear set to different gear ratio positions, a rotatable shaft, an arm operated by said shaft for operating said rails and means on said rails for shifting said arm laterally with respect to said rails upon each operation of a rail by said arm.

18. In an automobile transmission, a gear set having operating rails to shift said gear set to different gear ratio positions, a rotatable shaft, means to operate said shaft, means movably mounted on said shaft and operated by said shaft to shift said rails to establish different gear ratios and cooperating means on said rails and shaft operated means to shift said shaft operated means to different positions on said shaft.

19. In an automobile transmission, a gear set having operating rails to shift said gear set to different gear ratio positions, a rotatable shaft, means to operate said shaft, means movably mounted on said shaft and operated by said shaft to shift said rails to establish different gear ratios and means fixedly mounted on said shaft and operated by said shaft for returning said rails to neutral position.

20. In an automobile transmission, a gear set having operating rails to shift said gear set to different gear ratio positions, a rotatable shaft, means to operate said shaft and an arm shifted longitudinally of said shaft by said rails and rotated in one direction to engage and operate said rails to shift said gear set to different gear ratios.

21. In an automobile transmission, a gear set having operating rails to shift said gear set to different gear ratio positions, a rotatable shaft, means to operate said shaft, an arm movably mounted on said shaft and operated by said shaft to shift said rails to gear ratio positions and cooperating means on said arm and rails to shift said arm on said shaft upon movement of a rail to a gear ratio position.

22. In an automobile transmission, a gear set having operating rails to shift said gear set to different positions and shiftable means for operating said rails, said means rotating in one direction for all operations of said rails, in combination with manually operated means for shifting said rail operating means for selecting between the neutral position and a forward speed position of the gear set and cooperating means on said rails and rail operating means for normally shifting said rail operating means for operating said rails to shift said gear set to gear ratio positions in a predetermined sequence.

23. In an automobile, a gear set, rails for operating said gear set to gear ratio position, means for operating said rails and means carried by the rail which shifts the gears into low gear position, said rail carried means being so positioned on said rail that when said rail is in position for low gear said rail carried means engages said rail operating means and positions said rail operating means for shifting said gear set into intermediate gear position upon its next operation.

24. In an automobile, a gear set, rails for operating said gear set to gear ratio positions, means for operating said rails and means carried by the rail which shifts the gears into low gear position, said rail carried means being so positioned on said rail that when said rail is in position for low gear said rail carried means engages said rail operating means and positions said rail operating means for shifting said gear set into another gear ratio position upon the next operation of said rail operating means.

25. In an automobile, a gear set, rails for operating said gear set to gear ratio positions, means for operating said rails and means carried by the rail which shifts the gears into reverse gear position, said rail carried means being so positioned on said rail that when said rail is in position for reverse gear said rail carried means engage said rail operating means and positions said rail operating means for shifting said gear set into another gear ratio position on its next operation.

26. In an automobile, a gear set, rails for operating said gear set to gear ratio positions, means for operating said rails, means carried by the rail which shifts the gear set into intermediate gear position, said rail carried means being so positioned on said rail that when said rail is in position for intermediate gear said rail carried means engages said rail operating means and positions said rail operating means for shifting said gear set into high gear position upon the next operation of said rail operating means.

27. In an automobile, a gear set, rails for operating said gear set to gear ratio positions, means for operating said rails, means carried by the rail which shifts the gear set into intermediate gear position, said rail carried means being so positioned on said rail that when said rail is in position for intermediate gear said rail carried means engages said rail operating means and positions said rail operating means for shifting said gear set into another gear ratio position upon the next operation of said rail operating means.

28. In an automobile, a gear set, rails for operating said gear set to gear ratio positions, means for operating said rails, means carried by the rail which shifts the gear set into high gear position, said rail carried means being so positioned on said rail that when said rail is in position for high gear said rail carried means engage said rail operating means and positions said rail operating means for shifting into intermediate gear positions upon the next operation of said rail operating means.

29. In an automobile, a gear set, rails for operating said gear set to gear ratio positions, means for operating said rails, means carried by the rail which shifts the gear set into high gear position, said rail carried means being so positioned on said rail that when said rail is in position for high gear said rail carried means engages said rail operating means and positions said rail operating means for shifting said gear set to another gear ratio position upon the next operation of said rail operating means.

30. In an automobile, a gear set, an operating shaft for said set, means fixed on said shaft for shifting the gears to neutral position, means movably mounted on said shaft for shifting the gears to different gear positions and means for automatically shifting said means on said shaft to operate said gear set to different gear positions in a predetermined sequence.

31. In an automobile, a gear set, a shaft for operating said gear set, means on said shaft for shifting the gear set to neutral position in the first part of its movement of operating, separate means adjustable on said shaft for shifting said gear set to gear ratio positions during a subsequent part of its movement of operation, and means for automatically shifting said separate means on said shaft to operate said gear set to different gear positions in a predetermined sequence.

32. In an automobile, a gear set, a rotatable shaft for operating said gear set, levers fixed on said shaft for shifting said gear set to neutral position during the first part of the rotation of said shaft, means adjustably mounted on said shaft for shifting said gear set into a gear ratio position during the subsequent part of the rotation of said shaft and means for automatically shifting said separate means on said shaft to operate said gear set to different gear positions in a predetermined sequence.

33. In an automobile, a gear set, rails for operating said gear set to gear ratio position, means for operating said rails and means carried by the rail which shifts the gears into low gear position, said rail carried means being so positioned on said rail that when said rail is in position for low gear said rail carried means engages said rail operating means and positions said rail operating means for shifting said gear set into intermediate gear position upon its next operation, said means on said rail and said rail operating means engaging in the low gear position of said gear set only.

34. In an automobile, a gear set, rails for operating said gear set to gear ratio positions, means for operating said rails and means carried by the rail which shifts the gears into reverse gear position, said rail carried means being so positioned on said rail that when said rail is in position for reverse gear said rail carried means engages said rail operating means and positions said rail operating means for shifting said gear set into another gear ratio position on its next operation, said means on said rail and said rail operating means engaging in the reverse gear position of said gear set only.

35. In an automobile, a gear set, rails for operating said gear set to gear ratio positions, means for operating said rails, means carried by the rail which shifts the gear set into intermediate gear position, said rail carried means being so positioned on said rail that when said rail is in position for intermediate gear said rail carried means engages said rail operating means and positions said rail operating means for shifting said gear set into another gear ratio position upon the next operation of said rail operating means, said means on said rail and said rail operating means engaging in the intermediate gear position of said gear set only.

36. In an automobile, a gear set, rails for operating said gear set to gear ratio positions, means for operating said rails, means carried by the rail which shifts the gear set into high gear position, said rail carried means being so positioned on said rail that when said rail is in position for high gear said rail carried means engages said rail operating means and positions said rail operating means for shifting said gear set to another gear ratio position upon the next operation of said rail operating means, said means on said rail and said rail operating means engaging in the high gear position of said gear set only.

37. In an automobile, a gear set, means automatically positioned for shifting said gear set into gear positions, means for shifting said gear set into neutral position and manually operated means for positioning said first-mentioned means for preventing operation of said gear set to a gear position by said operating means upon operation of said gear set to neutral position.

38. In an automobile, a gear set, means automatically positioned for shifting said gear set into gear positions, means for shifting said gear set into neutral position and manually operated means for shifting said gear set operating means to prevent operation of said gear set to a gear position by said gear set operating means upon operation of said gear set to neutral position.

39. In an automobile, a gear set, rails for shifting said gear set, rotating means for operating said rails, said operating means having different positions relative to said rails for shifting said gear set to different gear engagements, and automatic means for moving said operating means to a different position relative to said rails upon the completion of one gear shifting operation so as to operate said gear set to a different gear engagement on its next operation.

40. In an automobile, a gear set, rails for shifting said gear set, rotating means for operating said rails, said operating means having different positions relative to said rails for shifting said gear set to different gear engagements, and automatic means for changing the relative position of said rails and said operating means upon the completion of one gear shifting operation so as to operate said gear set to a different gear engagement on its next operation.

41. In an automobile, a gear set, rails for shifting said gear set, rotating means for operating said rails, said operating means having different positions relative to said rails for shifting said gear set to different gear engagements, means controlling the speed of the vehicle, and means operated by said speed controlling means for changing the relative position of said rails and said rail operating means, upon the completion of one gear shifting operation, so as to operate said gear set to a different gear engagement on its next operation.

42. In an automobile, a gear set, rails for shifting said gear set, means for operating said rails, said operating means having different positions relative to said rails for shifting said gear set to different gear engagements, means controlling the speed of the vehicle, and means operated by said speed controlling means for changing the relative position of said rails and said rail operating means, during one gear shifting operation, so as to operate said gear set to a different gear engagement on its next operation.

43. In an automobile, a gear set, rails for shifting said gear set, means for operating said rails, said operating means having a certain position relative to said rails for shifting said gear set into reverse gear and a different position relative to said rails for shifting said gear set into different gear engagement, and automatic means for changing the relative position of said operating means and said rails upon the completion of shifting into reverse gear so as to shift said gear set into a different gear engagement on its next operation.

44. In an automobile, a gear set, rails for shifting said gear set, means for operating said rails, said operating means having different positions relative to said rails for shifting said gear set to different gear engagements, automatic means for changing the relative position of said rails and said operating means upon the completion of one gear shifting operation so as to automatically preselect the engagement of the gears for the next gear shifting operation, and manually operated means for changing the relative position of said operating means and said rails, so that said gears will be shifted on their next operation to a different position from that which was automatically preselected.

JAMES L. GETAZ.